United States Patent [19]
Brownmiller et al.

[11] Patent Number: 5,913,036
[45] Date of Patent: *Jun. 15, 1999

[54] RAW PERFORMANCE MONITORING CORRELATED PROBLEM ALERT SIGNALS

[75] Inventors: Curtis Brownmiller, Richardson; Michael Bencheck, Garland; Minh T. Tran, Plano; Robert Branton, Farmers Branch; Mark DeMoss, The Colony; Steve Landon, Richardson, all of Tex.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,847

[22] Filed: Jun. 28, 1996

[51] Int. Cl.[6] .............................. G06F 11/30; H04J 3/14
[52] U.S. Cl. ............................ 395/200.54; 395/200.53; 395/184.01; 395/183.01; 370/244; 370/241; 370/248; 370/249; 370/250; 371/20.1; 340/825.06
[58] Field of Search ................ 395/200.54, 200.53, 395/184.01, 183.15; 370/242, 241, 243, 246–250, 251–253, 229–231, 236, 466, 465; 340/825.06, 825.01, 825.16, 521, 522; 371/20.1, 20.2

[56] References Cited

U.S. PATENT DOCUMENTS

| | | | |
|---|---|---|---|
| 4,922,491 | 5/1990 | Coale .................................. | 395/183.02 |
| 4,937,825 | 6/1990 | Ballard et al. ......................... | 371/20.1 |
| 5,157,667 | 10/1992 | Carusone, Jr. et al. ............... | 371/29.1 |
| 5,189,674 | 2/1993 | Shimizu ................................ | 370/20.1 |
| 5,233,600 | 8/1993 | Pekarske ............................... | 370/14 |
| 5,299,201 | 3/1994 | Carusone, Jr. et al. ................ | 371/51 |
| 5,388,189 | 2/1995 | Kung ..................................... | 395/50 |
| 5,408,218 | 4/1995 | Svedberg et al. ...................... | 340/507 |
| 5,412,652 | 5/1995 | Lu ........................................ | 370/85.12 |
| 5,436,909 | 7/1995 | Dev et al. .............................. | 371/20.1 |
| 5,440,688 | 8/1995 | Nishida ................................. | 395/182.02 |
| 5,452,306 | 9/1995 | Turudic et al. ........................ | 370/110.1 |
| 5,455,832 | 10/1995 | Bowmaster ........................... | 371/20.1 |
| 5,463,634 | 10/1995 | Smith et al. ........................... | 371/20.6 |
| 5,473,596 | 12/1995 | Garafola et al. ...................... | 370/241 |
| 5,483,520 | 1/1996 | Eychenne et al. ..................... | 370/16.1 |
| 5,495,470 | 2/1996 | Tyburski et al. ...................... | 370/248 |
| 5,500,853 | 3/1996 | Engdahl et al. ....................... | 370/252 |
| 5,528,759 | 6/1996 | Moore .................................. | 395/200.11 |
| 5,557,616 | 9/1996 | Cadieux et al. ....................... | 370/509 |
| 5,566,161 | 10/1996 | Hartmann et al. .................... | 370/249 |
| 5,566,162 | 10/1996 | Gruber et al. ......................... | 370/13 |
| 5,619,656 | 4/1997 | Graf ..................................... | 395/200.54 |
| 5,623,480 | 4/1997 | Hartmann et al. .................... | 370/241 |

OTHER PUBLICATIONS

Banerjee et al., "ISDN Primary Rate Access Maintenance," *IEEE*, 1989, pp. 2.6.1–2.6.5.

Cadieux et al., "A New Network Element for Performance Monitoring and Test Access Spanning the Digital Hierarchy," *IEEE*, 1990, pp. 324.4.1–334.4.5.

Kerschberg et al., "Intelligent Network Management: A Heterogeneous Knowledge Source Approach," *IEEE*, 1990, pp. 314–316.

Mageed et al., "Fault Detection and Indentification Using a Hierarchical Neural Network–Based System," *IEEE*, 1993, pp. 338–343.

*Primary Examiner*—Tariq R. Hafiz
*Assistant Examiner*—Tuan Q. Dam

[57] ABSTRACT

A system and method for analyzing network performance by correlating network performance monitoring data reported by monitoring points in the network is described herein. The system analyzes the performance monitoring parameters by: determining whether the performance monitoring parameters contain non-zero values; determining whether the performance monitoring parameters exceed a predetermined threshold value; determining whether prior performance monitoring parameters exceed a predetermined threshold value. The system initiates a problem handling process if the step of analyzing indicates a possible network problem. The system maintains the problem handling process if the performance monitoring parameters continue to indicate a possible network problem.

14 Claims, 12 Drawing Sheets

RAW PERFORMANCE MONITORING CORRELATED PROBLEM ALERT SIGNALS

CROSS-REFERENCE TO OTHER APPLICATIONS

The following applications of common assignee contain some common disclosure as the present application:

U.S. patent application entitled "System and Method for Identifying the Technique Used for Far-End Performance Monitoring of a DS1 at a Customer Service Unit", application Ser. No. 08/671,028, now U.S. Pat. No. 5,768,291.

U.S. patent application entitled "System and Method for Formatting Performance Data In a Telecommunications System", application Ser. No. 08/670,905, now pending.

U.S. patent application entitled "System and Method for Reported Root Cause Analysis", application Ser. No. 08/670,844, now pending.

U.S. patent application entitled "System and Method for Unreported Root Cause Analysis", application Ser. No. 08/668,576, now pending.

U.S. patent application entitled "Enhanced Correlated Problem Alert Signals", application Ser. No. 08/670,848, now pending.

U.S. patent application entitled "Correlated Problem Alert Signals", application Ser. No. 08/673,271, now U.S. Pat. No. 5,778,184.

U.S. patent application entitled "System and Method for Reported Trouble Isolation", application Ser. No. 08/672,812, now U.S. Pat. No. 5,704,036.

U.S. patent application entitled "System and Method for Unreported Trouble Isolation", application Ser. No. 08/672,513, now U.S. Pat. No. 5,784,359.

U.S. patent application entitled "Monitor Point Identification", application Ser. No. 08/672,512, now U.S. Pat. No. 5,768,255.

U.S. patent application entitled "End-to-end Threshold Setting", application Ser. No. 08/670,845, now U.S. Pat. No. 5,796,723.

U.S. patent application entitled "Monitor Point Activation", application Ser. No. 08/672,356, now U.S. Pat. No. 5,787,074.

U.S. patent application entitled "System and Method for Tracking and Monitoring Network Elements", application Ser. No. 08/671,029, now pending.

The above-listed applications are incorporated herein by reference in their entireties.

BACKGROUND OF THE INVENTION

1. Field of the Invention

The present invention relates generally to telecommunication network management systems, and more specifically is directed toward the correlation of reported and unreported error activity.

2. Related Art

Telecommunication service providers (e.g., MCI Telecommunications Corporation) provide a wide range of services to their customers. These services range from the transport of a standard 64 kbit/s voice channel (i.e., DS0 channel) to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is performed by digital cross-connect systems. Digital cross-connect systems typically switch the channels at the DS1 and DS3 signal levels. Transmission of channels between nodes is typically provided via fiber-optic transmission systems. Fiber-optic transmission systems can multiplex a plurality of DS3 channels into a higher rate transmission over a single pair of fibers. In one example, signal formats for the fiber-optic transmission systems are defined by the manufacturer. These proprietary systems are referred to as asynchronous transmission systems.

Alternatively, a fiber-optic transmission system can implement the synchronous optical network (SONET) standard. The SONET standard defines a synchronous transport signal (STS) frame structure that includes overhead bytes and a synchronous payload envelope (SPE). One or more channels (e.g., DS1 and DS3 channels) can be mapped into a SPE. For example, a single DS3 channel can be mapped into a STS-1 frame. Alternatively, 28 DS1 channels can be mapped into virtual tributaries (VTs) within the STS-1 frame.

Various STS-1 frames can be concatenated to produce higher rate SONET signals. For example, a STS-12 signal includes 12 STS-1 frames, while a STS-48 signal includes 48 STS-1 frames. Finally, after an STS signal is converted from electrical to optical, it is known as an optical carrier (OC) signal (e.g., OC-12 and OC-48).

An end-to-end path of a provisioned channel within a network typically traverses a plurality of nodes. The term "provisioned channel" is defined as the end to end communication channel that is switched from one customer site or local exchange to another. This provisioned channel is carried over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the multiplexing and demultiplexing functions at each of the nodes.

One of the goals of a network management system is to monitor the performance of the provisioned channel. Performance of the provisioned channel can include various measures. One measure is the unavailability of the provisioned channel. Unavailability is generally defined as the amount (or fraction) of time that a channel is not operational. Various causes such as cable cuts can lead to channel downtime. Network responses to channel downtime can include automatic protection switching or various restoration procedures (e.g., digital cross-connect distributed restoration).

Although unavailability is a major performance measure from a customer's standpoint, other performance measures can also be critical. For example, if a customer desires a digital data service for the transmission of financial data, the number of errored seconds or severely errored seconds may be a concern.

In this environment, comprehensive performance monitoring analysis is difficult to accomplish. What is needed is a telecommunication network management system that can analyze error activity at various points of the network and identify the source of the error activity. This capability allows a service provider to proactively address potential problems in network performance, thereby minimizing the impact on the customer's perception of the quality of the provisioned service.

SUMMARY OF THE INVENTION

The present invention satisfies the above mentioned needs by providing a comprehensive network management system and method that can correlate repeated and related occurrences of problem activity and initiate a process to address the problem.

The first embodiment is a system and method for detecting intermittent network performance problems. The detection process begins upon the receipt of a problem alert signal (PAS). The system then initiates a problem handling process if a predetermined number of PASs have been received in a predetermined time period prior to receiving the PAS. The system then maintains the problem handling process if additional PASs are received. This system clears the problem and handling processes if no additional PASs are received in a predetermined time period.

The second embodiment is a system and method for analyzing network performance by correlating network performance monitoring parameters. The system operates by receiving performance monitoring parameters from monitoring points in the network. The system then analyzes the performance monitoring parameters to identify whether a potential network problem exists. The system initiates a problem handling process if the analysis indicates a potential network problem. The system maintains the problem handling process if the performance monitoring parameters continue to indicate a possible network problem.

The third embodiment is a system and method for correlating PASs that are generated along the path of a provisioned channel. In one example, line entity PASs are correlated to section entity PASs. The system operates by detecting a first problem or signal on a facility indicating a potential problem with a line entity. The system then determines whether a second problem or signal has been reported for a section entity within the line entity. If the second PAS has been reported for the section entity, the system initiates a problem handling process for the section entity. If the second PAS has not been reported for the section entity, the system initiates a problem handling process for the line entity. The system also correlates line and path entity PASs. Path entity PASs are correlated to line entity PASs. The system operates by detecting a first problem or signal on a facility indicating a potential problem with a path entity. The system then determines whether a second problem or signal has been reported for a line entity within the path entity. If the second PAS has been reported for the line entity, the system initiates a problem handling process for the line entity. If the second PAS has not been reported for the line entity, the system initiates a problem handling process for the path entity.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The operation and administration of a service provider's network is becoming increasingly complex. Network elements continue to evolve in support of the provision of a wider range of services. The overriding goal of network management is to ensure that all aspects of the network are operating according to both the service provider's design and the customer's expectations.

Figure 1:
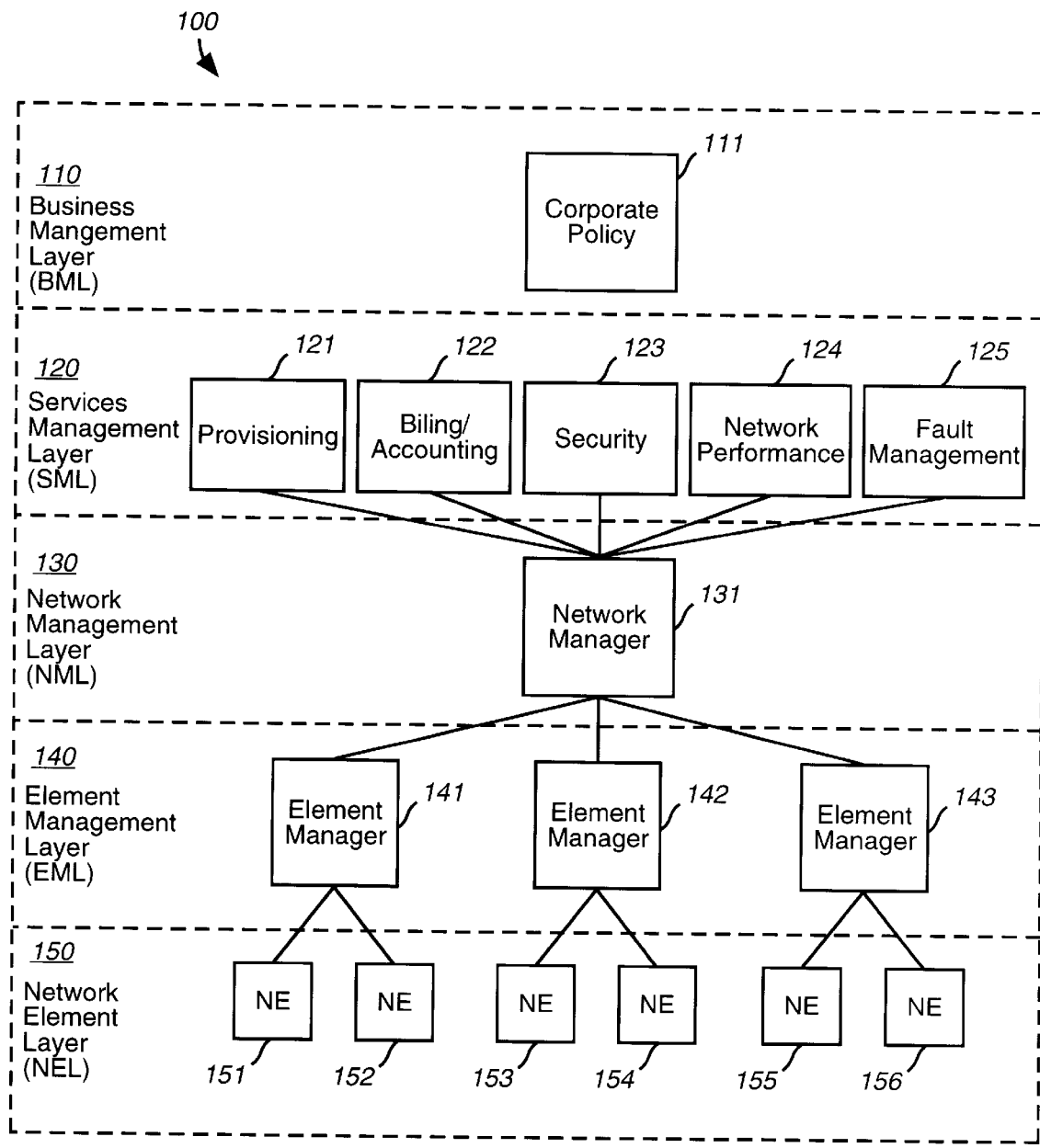
FIG. 1 illustrates the layers in a network management system.

FIG. 1 illustrates a network management hierarchy or system 100. The network management system 100 preferably complies with the International Telecommunications Union (ITU) Telecommunications Management Network (TMN) standard. The TMN standard defines a layered framework for a service provider to implement its own network management process.

The network management system 100 includes five layers 110, 120, 130, 140 and 150. Layer 150 is designated as the network element layer (NEL). The NEL is a physical layer that includes the various network elements (e.g., asynchronous systems, SONET systems, etc.) used in the transport and routing of network traffic (e.g., DS1, DS3, OC-N, etc.). Each network element 151–156 in NEL 150 can be designed to provide performance monitoring, alarm and status information to the higher network management layers 110, 120, 130 and 140. In particular, network elements 151–156 are connected to one of the element managers 141–143 in element management layer (EML) 140. For example, network elements 151 and 152 are connected to element manager 141. In this manner, each network element manager 141–143 controls a portion of the physical network embodied as NEL 150.

Element managers 141–143 can retrieve information from network elements 151–156 periodically or upon a user request. Alternatively, network elements 151–156 can be programmed to provide element managers 141–143 with a predefined subset of network management information at predefined time intervals. The domain of an element manager 141–143 can be defined by a vendor's equipment. In some situations, the domain of an element manager 141–143 is dictated by the geography in which network elements 151–156 reside.

After network management information is acquired by element managers 141–143 from network elements 151–156, it is forwarded to network management layer (NML) 130. NML 130 comprises network manager 131. Network manager 131 is logically shown as a single entity. In implementation, network manager 131 can comprise one or more sites. For example, multiple service centers (not shown) can exist at different parts of the country (e.g., east coast and west coast). In combination, these national-level service centers combine provide total visibility of the physical network in NEL 150. Network manager 131 can also be split among services and/or network elements. For example, in one embodiment, a first network manager is dedicated to asynchronous parts of the network, a second network manager is dedicated to DS1, DS3 and VT-n traffic, and a third network manager is dedicated to STS-n and OC-n traffic.

Generally, the logical entity identified as network manager 131 is a resource that is accessed by applications in service management layer (SML) 120. In FIG. 1, SML 120 is shown to include five applications 121–125. Specifically, SML 120 includes provisioning application 121, accounting/billing application 122, security application 123, network performance application 124, and fault management application 125. This listing of applications is provided without limitation. Any other application that utilizes network management data stored within NEL 150 can also be included. Note that parts of applications 121–125 can also reside in the NML 130 and EML 140.

Provisioning application 121 provides a customer interface for the provisioning of various services. For example, a customer can indicate a desire for a DS1 digital data service between network element 151 and network element 155. Upon receipt of this customer request, provisioning application 121 relays the provisioning commands to network manager 131. Network manager 131 then communicates with element managers 141, 143 and any other element managers that control a part of the end-to-end path to set up the DS1 connection from network elements 151–155.

Applications 122–125 can similarly support a customer interface by providing access to billing information, security information, performance information and fault management information, respectively. Each of these applications also access the resources that are stored within network manager 131.

Finally, network management system 100 also includes business management layer (BML) 110. BML 110 includes logical entity 111. Logical entity 111 represents the general corporate policy of network management system 100. Corporate policy 111 dictates the general business and contractual arrangements of the service provider.

Figure 2:
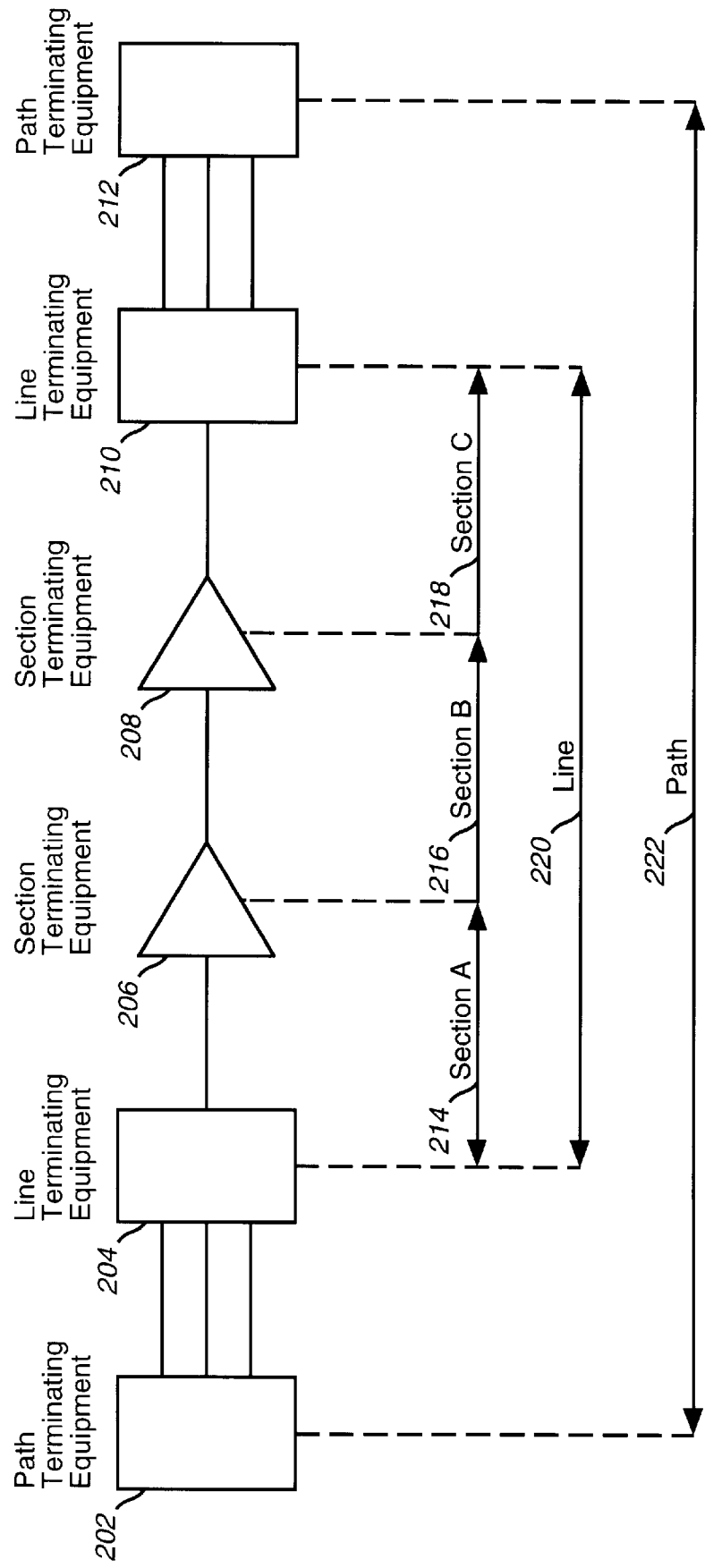
FIG. 2 illustrates an end to end path of a SONET network.

FIG. 2 illustrates a synchronous optical network (SONET) system hierarchy including: section entities 214, 216, 218, line entity 220, and path entity 222. Path entity 222 is terminated by path terminating equipment (PTE) 202 and 212. PTE 202, 212 multiplex signals from the local exchange or customer site into higher data-rate channels for transmission to the line terminating equipment (LTE) 204 and 210. The path entity 222 is defined in the example of FIG. 2 as the end-to-end logical link traversing network elements 202–212.

Figure 3:
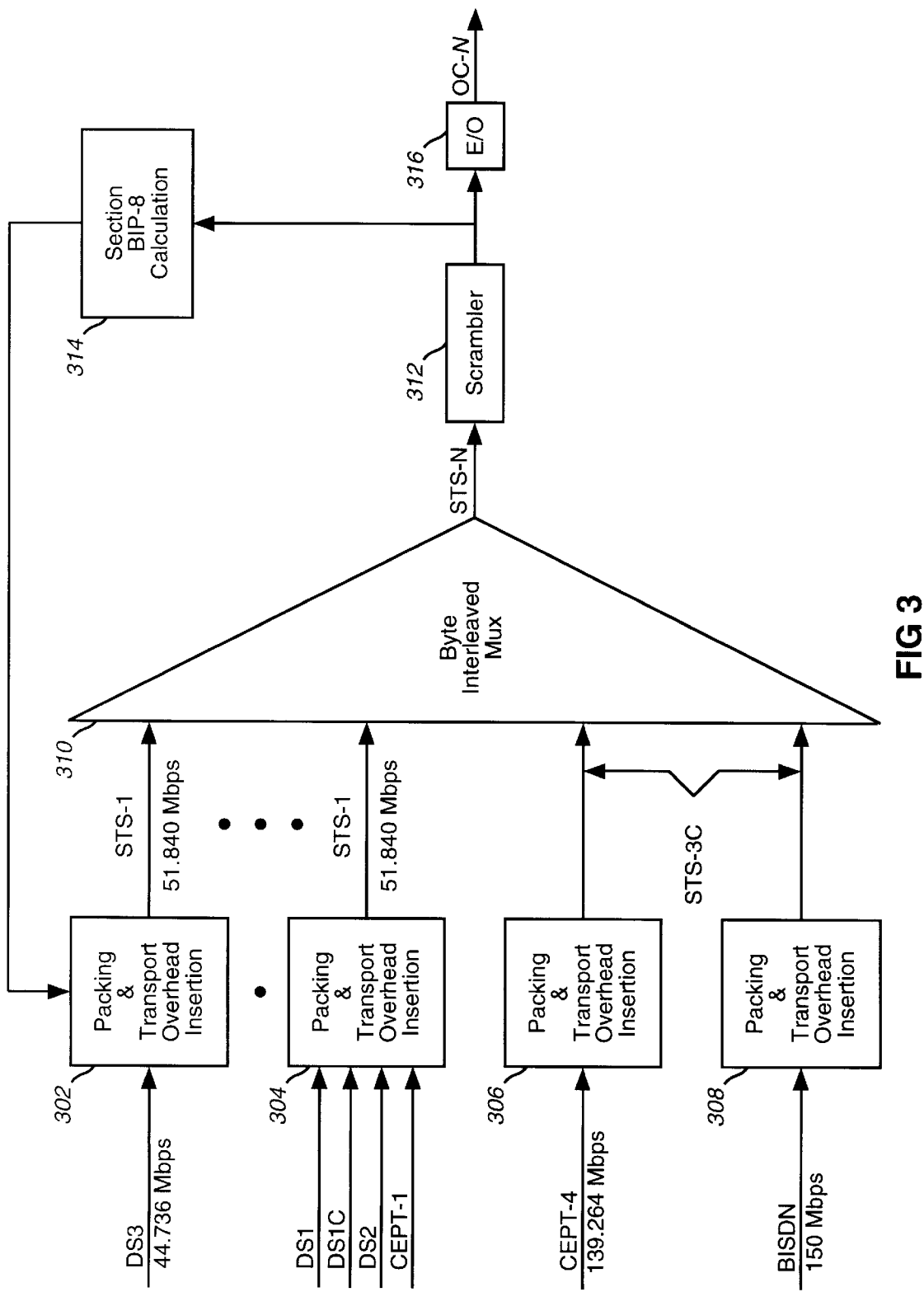
FIG. 3 illustrates an exemplary SONET multiplexer.

Line entity 220 is terminated by LTE 204, 210. LTEs 204, 210 are typically multiplexers that combine a plurality of lower data-rate channels into optical carrier rate channels (OC-N). FIG. 3 illustrates LTE 204, 210 in greater detail. Low data-rate channels (e.g., DS1 and DS3) are mapped into STS-1 frames at insertion points 302, 304 and into STS-3C channels at insertion points 306, 308. Multiple STS-1 and STS-3C channels are multiplexed at Byte Interleaved Mux 310 into an STS-N channel (e.g. STS-48). The optical data rate signal, STS-N, is then scrambled by scrambler 312. The scrambled data is provided to Section BIP-8 314 to generate the parity bits to be used in subsequent error checking. The scrambled STS-N is then converted from an electrical to optical signal (i.e., OC-N) at electrical-to-optical converter 316.

The optical data channel on the line may include section-terminating equipment (STE). STEs are typically regenerator or repeater equipment on the OC-N itself. The STEs 206, 208 define the section entities on the line. In the example of FIG. 2, section entities 214, 216, 218 are defined by LTEs 204, 210 and STEs 206, 208.

As noted above, FIG. 2 illustrates section entities 214–218, line entity 220 and path entity 222 in an exemplary channel (e.g., DS1, DS3, STS-3C, etc.) provisioned between source 202 and destination 212. In this example, the provisioned channel originates at source 202, traverses multiplexer 204, regenerators 206 and 208, and multiplexer 210, and terminates at destination 212. Each network element 202, 204, 206, 208, 210 and 212 inserts and extracts overhead information. In the SONET context, section and line overhead information is contained within the transport overhead portion of a well known STS frame (not shown). Path overhead information, on the other hand, is contained within the well known SPE information payload.

Note that the terms section, line and path are used herein without limitation. As would be apparent to one of ordinary skill in the relevant art, the problem alert signal (PAS) and performance monitoring data correlation process could be extended to other network transmission standards having analogous network sectionalization.

Enhanced Problem Alert Signals

Problems in the network may or may not involve actual system downtime. In other words, problems in the network may manifest themselves as degradations in system performance. An example of performance degradation includes an increase in the bit error rate (BER). Bit errors are typically measured in terms of errored seconds (ESs) and severely errored seconds (SESs). An unacceptable increase in the BER of the provisioned channel may prove unsatisfactory to the customer. In many instances, customer expectations of performance of a provisioned channel are defined by the requirements contained within a service contract. The service contract may correlate system performance to the tariffing structure. If the number of ESs, SESs or unavailability of the service becomes excessive, customer rebates may be in order.

Over a period of time, a monitoring point associated with network element 151 may observe an excessive number of ESs on a received channel. Generally, monitoring points monitor, collect and store performance data (errors) pertaining to each network element 151–156. Depending on the design of the network element, the data can either be reported to the layers in network management system 100, or made available to the layers in network management system 100 for retrieval. If the monitoring point determines that the monitored error activity indicates a possible network problem, a PAS is reported to an element manager 141–143. In one example, a PAS is generated if the monitoring point determines that the number of ESs exceeds a predefined threshold value. Any other statistical analysis by the monitoring point can also cause the monitoring point to report a PAS. In the remainder of the description, PASs will be used to describe the general class of reported error activity.

Problems on the line, section or path entities that are not considered critical nevertheless effect customer service. These problems degrade performance but are not serious enough to trigger a problem handling process. When considered individually, repeated non-critical PASs might not trigger a problem handling process. When considered together, however, such repeated non-critical PASs might indicate a more serious problem with the equipment. A process is needed, therefore, to identify multiple related non-critical PASs and initiate a problem handling process upon identification.

Various problem handling processes are mentioned herein. Generally, a problem handling process acts to address a problem. The particular actions that a problem handling process performs depends on how a system designer desires to address the associated problem. In some cases, the system designer may wish to diagnose the problem, in other cases the system designer may wish to solve the problem, in still other cases the system designer may wish to delegate the problem to another entity. Thus, the nature of problem handling processes is implementation dependent.

As noted above, monitored error activity on a provisioned channel can be reported as a PAS to the layers in network management system 100. Upon receipt of a PAS, the layers in network management system 100 may choose to initiate a problem handling process. An example of problem handling processes is the initiation of a service call to repair the affected facility. In more extreme situations where persistent error activity exists, a layer in network management system 100, could effect a temporary switch around the affected facility, thereby maintaining the level of network performance required by the customer.

PASs that are generated by a network element 151–156 are reported to the EML 140. The PAS generated by the monitoring point associated with network element 151–156, however, can only be reported to the element managers 141–143 that can "see" the network element 151–156. FIG. 1, for example shows network elements 151–152 connected to element manager 141. When either network element 151 or 152 reports a PAS, it will be received by element manager 141 in the EML 140.

The element managers 141–143 will process and analyze the PAS reported from the NEL 150. Depending on the nature of the problem triggering the PAS the element manager 141–143 may raise it to the next highest layer in network management system 100. In the example environment of FIG. 1, the element manager 141–143 would elevate the PAS to the network manager 131 in NML 130.

PASs are elevated through the layers in network management system 100 to ensure that each of the layers 110–140 has the information necessary to identify problems in the NEL 150. Since not all of the entities in the layers of network management system 100 receive PASs from all of the network elements 151–156 on the path, the PASs must be elevated through the layers in network management system 100 to enable the problem identification and correlation process to be performed.

Figure 4:
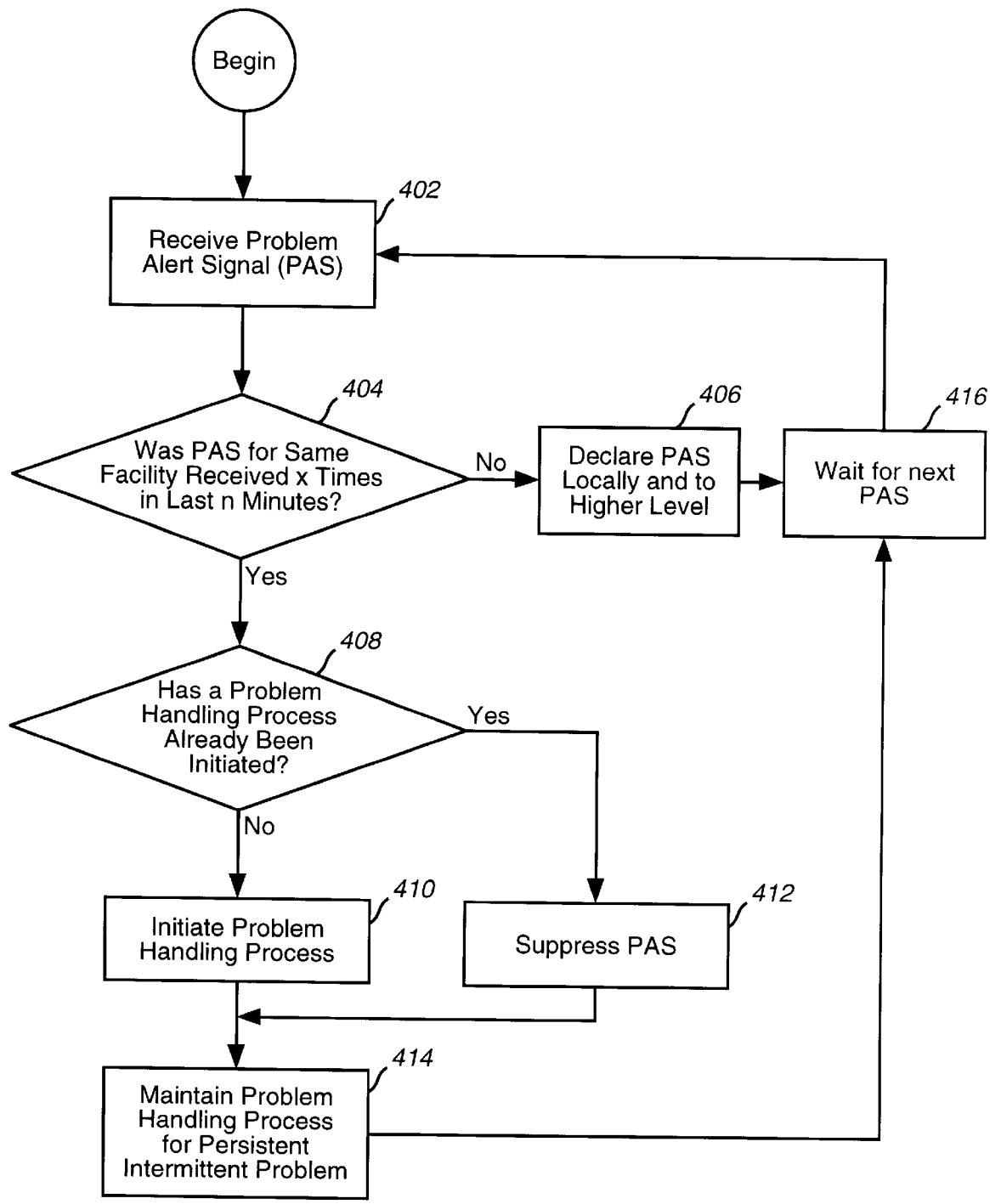
FIGS. 4 and 5 illustrate the preferred flow charts of the problem alert signal enhancement process.

FIG. 4 illustrates a process to enhance the detection of intermittent problems on a provisioned channel. The process can be performed by any of the layers in management system 100. In the following description, the process of FIG. 4 is described as being performed by the network manager 131. In step 402, a PAS is received by network manager 131. The PAS originated from one of the monitoring points associated with a network element 151–156 in the NEL 150. As noted above, an excessive number of ESs or SESs could have triggered a PAS at section, path, or line terminating equipment. Such errors may be common and do not necessarily indicate that a serious problem exists within a particular network element. Multiple low-level error PASs, however, may indicate more serious problems.

In step 404, after the receipt of a PAS at step 402, network manager 131 determines whether a related PAS was received for the same facility, or network element in the past. Specifically, the network manger 131 determines whether multiple PASs have been received, in a predetermined time period. When considered individually, repeated non-critical PASs might not trigger a problem handling process. When considered together, however, such repeated non-critical PASs might indicate a more serious problem with the facility.

If network manager 131 determines at step 404 that related PASs have not been received during the time period, then in step 406 the PAS is declared in the NML 130 and sent to the next highest layer in network management system 100 (i.e., SML 120). As used herein, the term "declared" means that the PAS will continue to be analyzed at the current level. When a PAS is suppressed, it is no longer considered by any of the network management layers 110, 120, 130, 140, 150 and will not be elevated for further analysis. After the PAS is declared and elevated, the process then awaits the next PAS in step 416.

If network manager 131 determines at step 404 that related PASs have been received during the time period, then the process continues to step 408. In step 408 the network manager 131 determines whether a problem handling process has already been initiated. If a problem handling process has been initiated, then step 412 is performed (described below). Otherwise, if a problem handling process has not been initiated, then step 410 is performed.

In step 410, the network manager 131 initiates a problem handling process. As noted above, examples of problem handling processes can be, but are not limited to, initiating a service call to repair the affected facility, raising an alarm to service personnel or temporarily switching around the affected facility to maintain the level of network performance required by the customer. As will be appreciated by persons skilled in the relevant art(s), the nature of problem handling processes is implementation dependent.

In step 412, the network manager 131 suppresses the PAS. Suppression of redundant PASs precludes initiation of multiple independent problem handling processes. Processing efficiency is thereby improved.

As represented by step 414, after a problem handling process is initiated, it continues until it is evident that the intermittent problem which caused the initiation of the problem handling process no longer exists.

Figure 5:
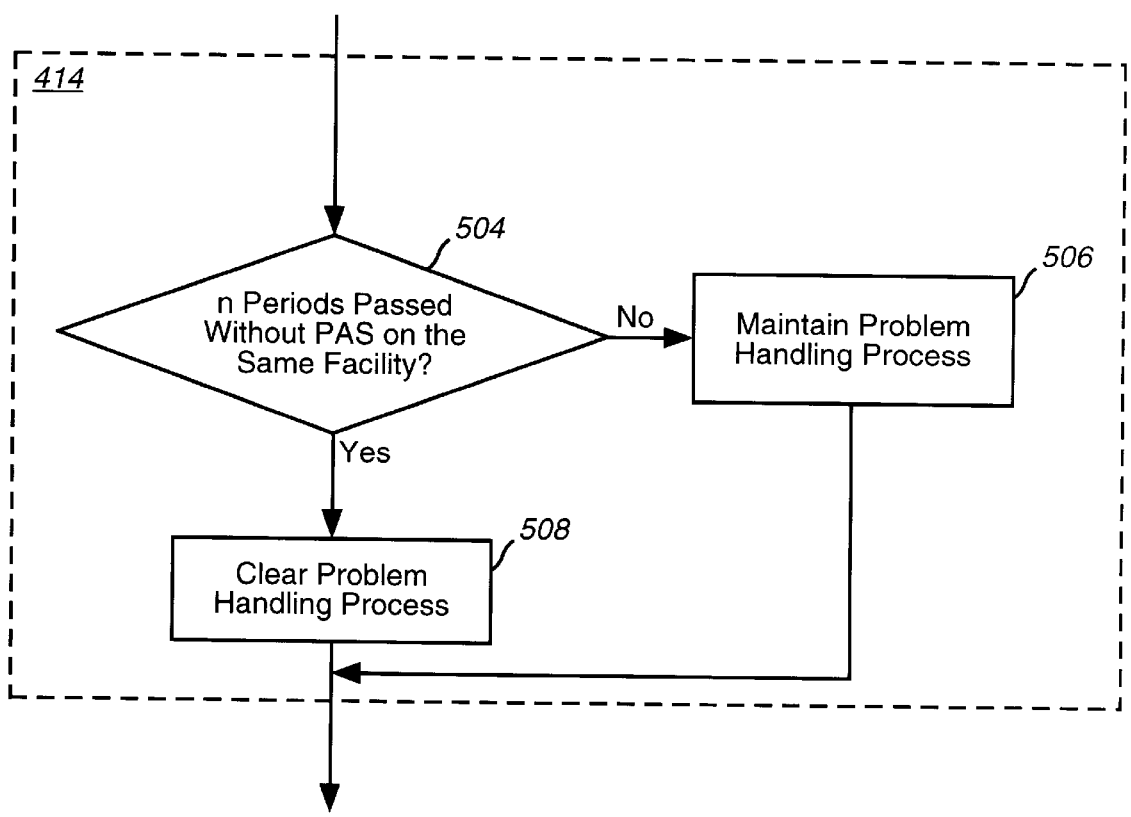

FIG. 5 is a flowchart depicting the manner in which step 414 is performed. The process can be performed by any of the layers in network management system 100. For illustrative purposes, FIG. 5 shall be described with reference to the network manager 131 in the NML 130. In particular, the steps of FIG. 5 represent the manner in which the invention determines that an intermittent problem no longer exists. In step 504, the network manager 131 determines if a predetermined amount of time has passed without receipt of further related PASs on the same facility. The amount of time will be depend on the nature of the PASs received, the problem handling processes initiated, and the location of the problem. The predetermined amount of time, therefore, is implementation specific. If no additional related PASs are received within a predetermined period, the problem handling process is discontinued (i.e., terminated or cleared) at step 508.

If further related PASs have been reported in the predetermined period, the problem handling process is maintained at step 506. This ensures that temporary intermittent problems that are not severe enough to be considered critical and clear themselves, do not cause excessive occurrences of problem handling processes.

Thus far in the application, a first embodiment of the invention where PASs are correlated for improved problem identification has been described, now we will discuss a second embodiment of the invention where raw PM data is analyzed to improve problem identification.

Raw Performance-Monitoring Correlated Problem Alert Signals

The raw PM data correlation process of the second embodiment of the invention begins when one of the layers in network management system 100 identifies the existence of a possible network problem through the analysis of PM data. In this second embodiment, it is assumed that the raw PM data being analyzed did not cause a monitoring point associated with network elements 151–156 in NEL 150 to report a PAS. Rather, the layers in network management system 100 analyze the appearance of non-zero error activity over a period of time. This period of time could represent a number of days or weeks.

One goal of raw PM data analysis is to identify network problems at the earliest possible stage. In other words, it is desirable for a service provider to identify a potential network problem before any significant effects are felt by the customer. In this manner, the service provider is able to correct a problem before the customer is aware that a problem exists.

One example of a potential problem is the existence of "dribble" errors. In this context, dribble errors are used to refer to a situation where a system is operating satisfactorily but not error-free. Errors that are reported by the monitoring points to network management layers 120, 130, 140 are typically not large enough to cause a monitoring point to declare a PAS. Ordinarily, these nonzero error reports would not prompt any action by a service provider. However, these non-zero errors could indicate that a network element 151–156 is operating at a point near the acceptable tolerance levels. Numerous examples exist.

Intermittent errors could simply be caused by a dirty connector in a fiber-optic link. In other cases, synchronization shifts could cause jitter tolerance levels to be exceeded. In other examples, temperature or humidity variations could cause network element performance to periodically degrade.

Regardless of the cause, intermittent non-zero error reports will be provided the layers in network management system 100. Each one of layers in network management system 100 can independently analyze the existence of nonzero error activity over a period of time. Experience in the analysis of the nonzero error activity can lead to a correlation between specific patterns of error activity with the existence of specific network problems.

Figure 6:
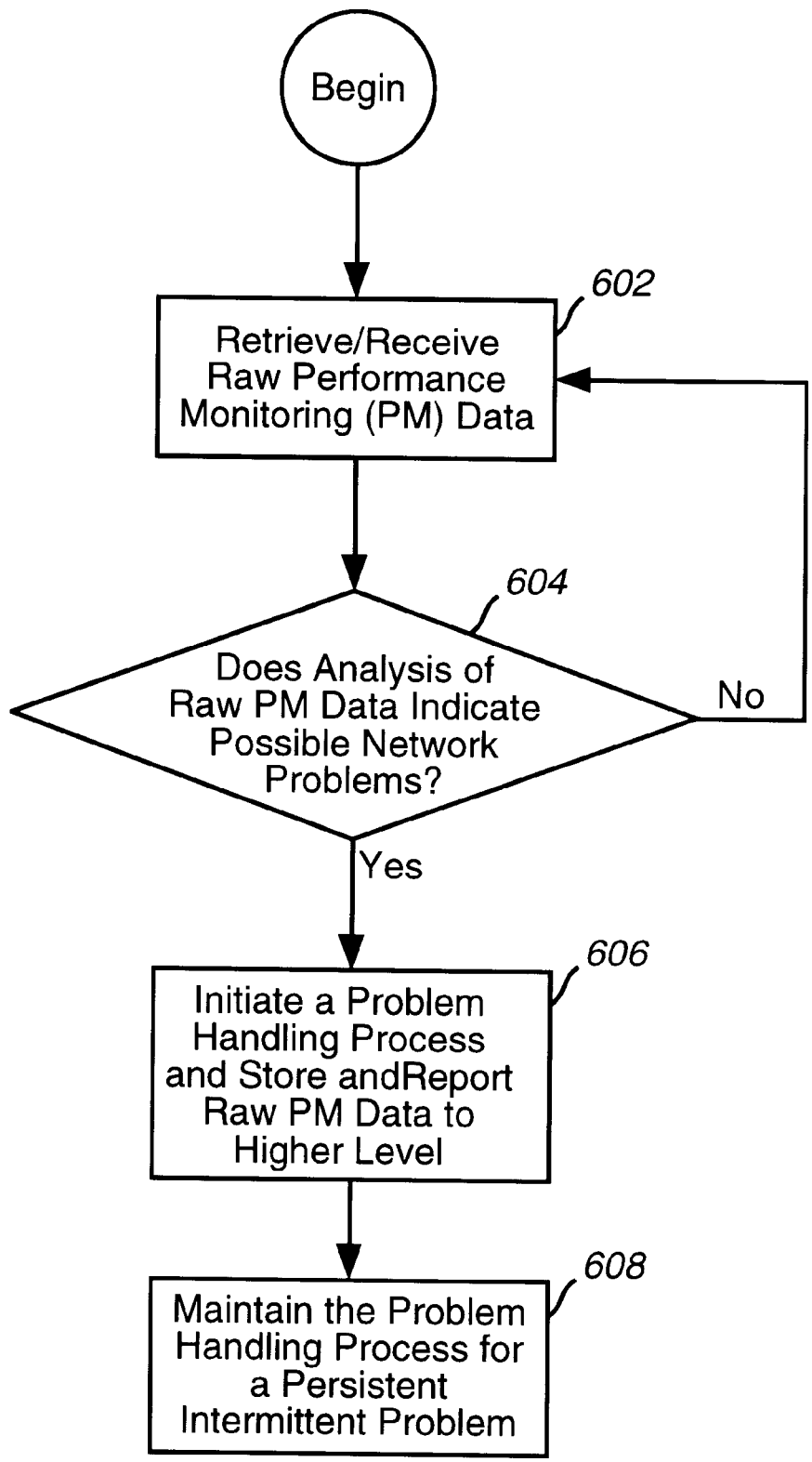
FIGS. 6–8 illustrate preferred flow charts of the raw performance monitoring data problem alert signal process.

FIG. 6 illustrates the raw PM correlation process for detection of problems on the path from raw PM data. The process can be performed by any of the layers in network management system 100. For illustrative purposes, FIG. 6 shall be described with reference to the network manager 131 in the NML 130. It should be understood, however, that the following discussion also applies to entities in the SML 120 and the EML 140.

In step 602, the network manager 131 retrieves or receives raw PM data collected during a monitoring period. The raw PM data may either be reported by the monitoring points, or retrieved by applications in the layers of network management system 100 depending on the design of the equipment and applications.

In step 604, the network manager 131 analyzes the raw PM data in relation to raw PM data collected in previous monitoring periods. The correlation of raw PM data across multiple monitoring periods enables network manager 131 to detect problems with the equipment on the path of the provisioned channel at step 604. If the raw PM data collectively does not indicate a performance degradation or problem with the path, the network manager 131 returns to step 602 to wait for the next report of PM data.

If network manager 131 determines at step 604 that the raw PM data collectively indicates a possible network problem, then a problem handling process is initiated in step 606. Again, as noted above, this problem handling process may involve switching the communication channel around the affected equipment or generating an alert or alarm indicating a need to repair the equipment. The problem handling process is implementation dependent. The raw PM data is then stored and reported to the next highest layer in network management system 100, in this case the SML 120, to allow further analysis.

In step 608, the network manager 131 continues the problem handling process until it is evident that the intermittent problem which caused the initiation of the problem handling process no longer exists.

Figure 7:
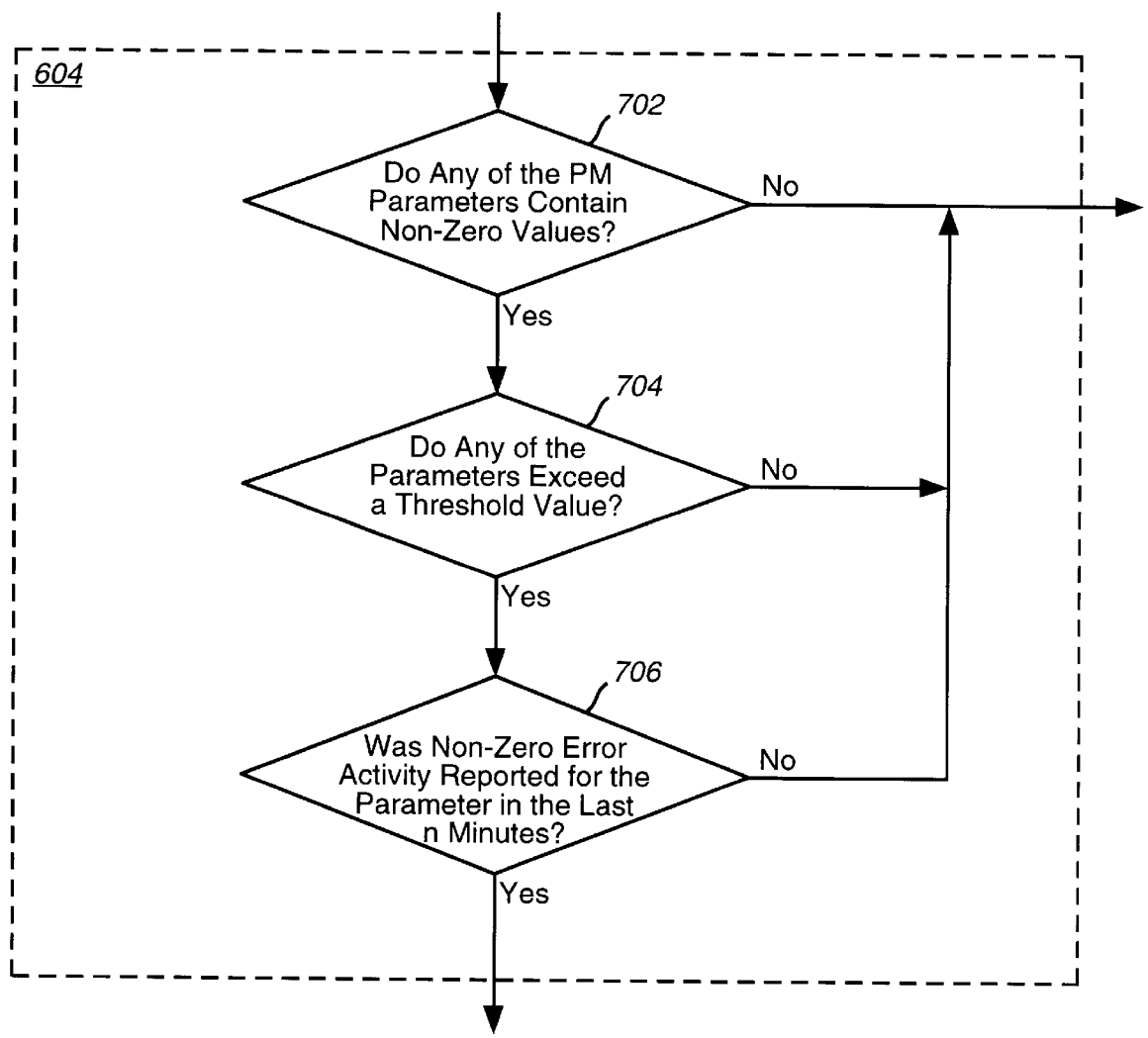

FIG. 7 illustrates a more detailed view of step 604. Step 604 can be performed by any of the layers in network management system 100. For illustrative purposes, FIG. 7 shall be described with reference to the network manager 131 in the NML 130. Specifically, FIG. 7 illustrates a flowchart representing one method of analyzing the raw PM data. In step 702, the network manager 131 analyzes the raw PM data that was received in step 602 to determine whether it contains non-zero values indicating performance degradation on the path. If the raw PM data does not indicate performance degradation, the network manager 131 waits to receive the next raw PM data report.

If the raw PM data parameters contain non-zero values, then in step 704 the network manager 131 examines the raw PM data parameters to determine if any of the parameters exceed a threshold value. Note that this threshold value can be distinct from a threshold used to generate a PAS. Examples of such parameters and thresholds could be the count for ESs or SESs on the path element. The threshold value is implementation dependent, and depends on a number of factors, such as the desired sensitivity of the error detection mechanism, the expected number of errors on the monitored channel, etc. If none of the parameters exceed a threshold value, then the network manager 131 in step 602 (FIG. 6) waits for the next performance monitoring data report.

If one of the raw PM data parameters exceeds a threshold value at step 704, then the network manager 131 in step 706 determines if there have been multiple occurrences of non-zero error activity reported for the parameter above the threshold value in a predetermined period of time. In one example, the determination of step 706 is satisfied based upon a similar threshold used in determination step 704. If there have been multiple occurrences of non-zero error activity of the parameter in a predetermined period of time, then step 606 (FIG.6) is performed. As described above, in step 606 a problem handling process is initiated. For example, if successive raw PM data reports from a particular multiplexer acting as a line terminating element indicate sporadic nonzero error activity in the last 30 minutes of raw PM data reports, a problem handling process is initiated. This scenario could indicate the presence of a dribble error. If successive reports do not indicate multiple occurrences of nonzero zero error activity, then the network manager 131 in step 602 (FIG. 6) waits for the next raw PM data report.

Note that the exemplary process illustrated in FIG. 7 can be replaced by any means of statistical analysis of historical data. For example, if specific patterns of error activity are known to lead to certain failures, general pattern recognition systems (e.g., neural networks) can be used for triggering purposes. As noted above, this statistical analysis can be performed by entities in each of layers in network management system 100 simultaneously. The only difference in processing is the scope of PM data that is available to an entity in the particular layers of network management system 100.

Figure 8:
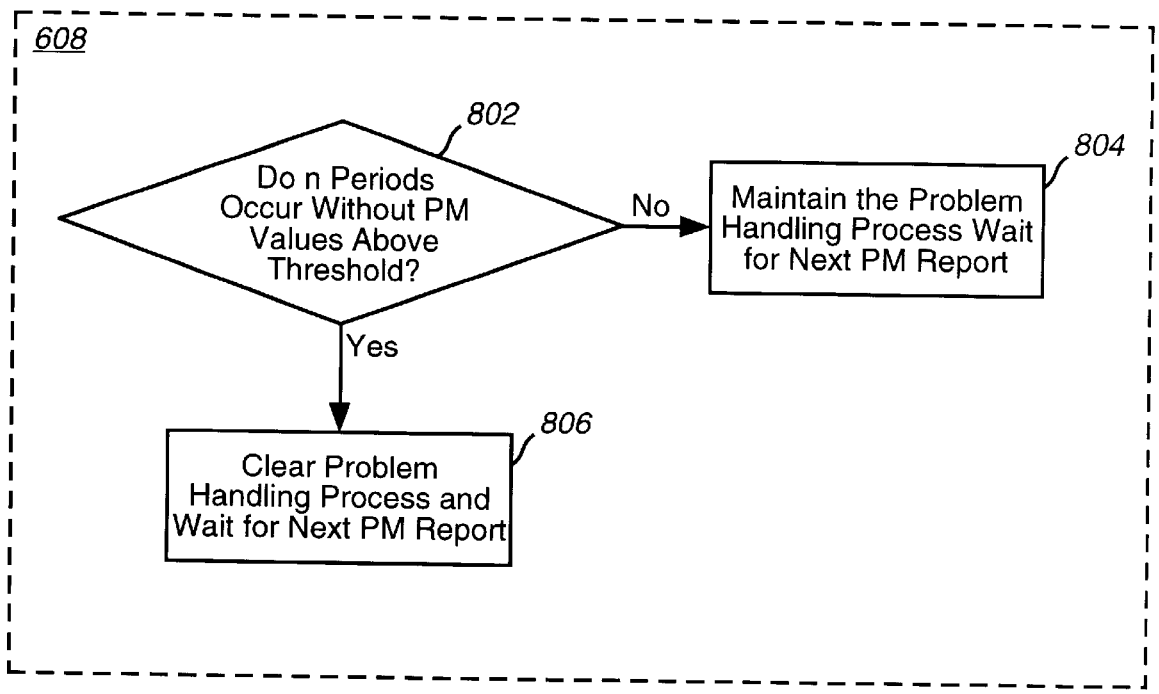

FIG. 8 further illustrates step 608, which determines when an intermittent problem no longer exists. Step 608 can be performed by any of the layers in network management system 100. For illustrative purposes, FIG. 8 shall be described with reference to the network manager 131 in the NML 130. In step 802, the network manager 131 determines if a sufficient amount of time has passed without further receipt of related raw PM data reports indicating possible network problems for a particular network element. If so, the problem handling process is discontinued at step 806. If there have been raw PM reports with parameters indicating possible network problems in the predetermined period for the particular network element, then the problem handling process is maintained at step 804. This ensures that temporary intermittent problems do not cause excessive occurrences of problem handling processes.

Thus far in the application, a second embodiment of the invention where raw PM data is analyzed to improve problem identification has been described. Now, a third embodiment of the invention where PASs are analyzed and correlated to improve problem identification will be described.

Correlated Problem Alert Signals

A single equipment problem on a SONET network path can manifest itself as multiple PASs. For example, if a first regenerator operating as STE generates data errors on an OC-48 line, a PAS may be generated by a monitoring point associated with a second regenerator downstream of the first regenerator. Additionally, a PAS may be generated by a monitoring point associated with the downstream LTE. These multiple PASs may generate multiple problem handling processes, even though all of the PASs really originate from a single problem on the STE facility.

Figure 9:
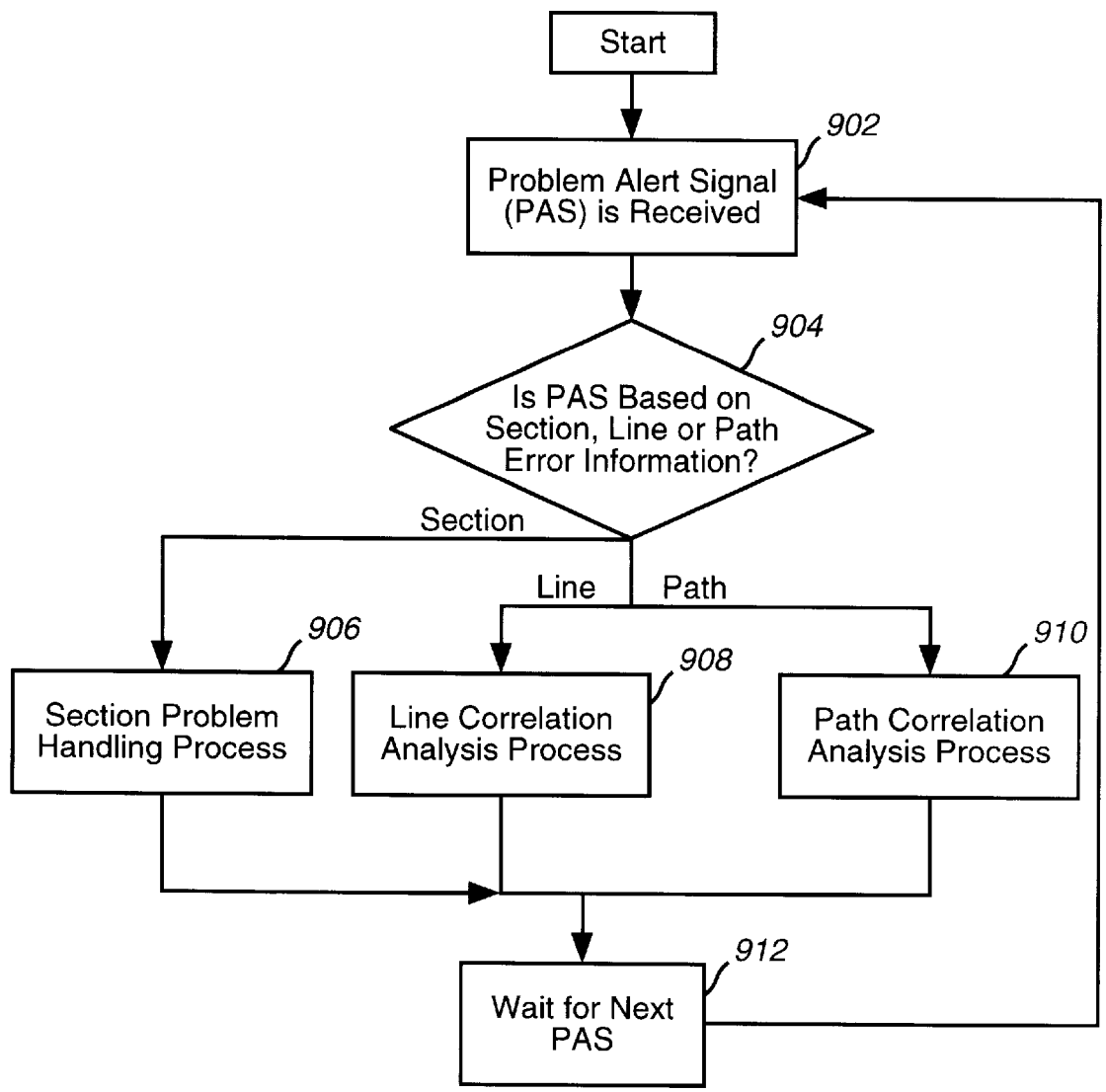
FIGS. 9–11 illustrate preferred flowcharts of the problem alert signal correlation process.

FIG. 9 is a flowchart representing the preferred manner in which an entity in the EML 140, the NML 130 and SML 120 correlates multiple PASs to a single facility. The process can be performed by entities in any of the layers in network management system 100. For the purposes of explanation, the process of the following example will be described as being performed by the element manager 141. The correlation process begins at step 902, where the element manager 141 receives a PAS from the adjacent lower layer (i.e., the NEL 150). At step 904, the element manager 141 then determines if the PAS originates from a section, line or path facility on the network. If the PAS originates from a section entity network element, the element manager 141 starts a section entity problem handling process at step 906. This problem handling process is targeted to address a problem on the specific section facility that generated the PAS. Since a section entity is the smallest network element, the PAS received for that element must be related to a problem on that section facility. A correlation analysis of a section entity PAS, therefore, is unnecessary. Accordingly, after initiating the section entity problem handling process the element manager 141 in step 912 waits to receive the next PAS in step 912.

If the PAS received by the element manager 141 is for a line entity network element, then the element manager 141 performs step 908 wherein a line-correlation analysis process is initiated. A line entity may contain multiple section entities. Thus, a line PAS may originate on a line termination facility, possibly indicating a problem on a section terminating facility. Note that if a section facility caused an error, a section entity PAS may also have been generated. Independent problem handling processes for these line and section entity PASs is inefficient. Thus, a line-correlation analysis process is used in step 908 to determine if the line PAS is a redundant artifact of an already reported section PAS.

If the PAS received at the network layer originates from a path entity network element, the element manager 141 in step 910 begins a path correlation analysis process. Since a path entity may contain multiple line entities, a path PAS may originate on a path terminating facility, possibly indicating an error on a line terminating facility. A path-correlation analysis process, therefore, must be performed in step 910 to determine if the path PAS is a redundant artifact of an already reported line PAS.

After performing step 906, 908 or 910, the element manager 141 in step 912 waits to receive the next PAS.

Figure 10:
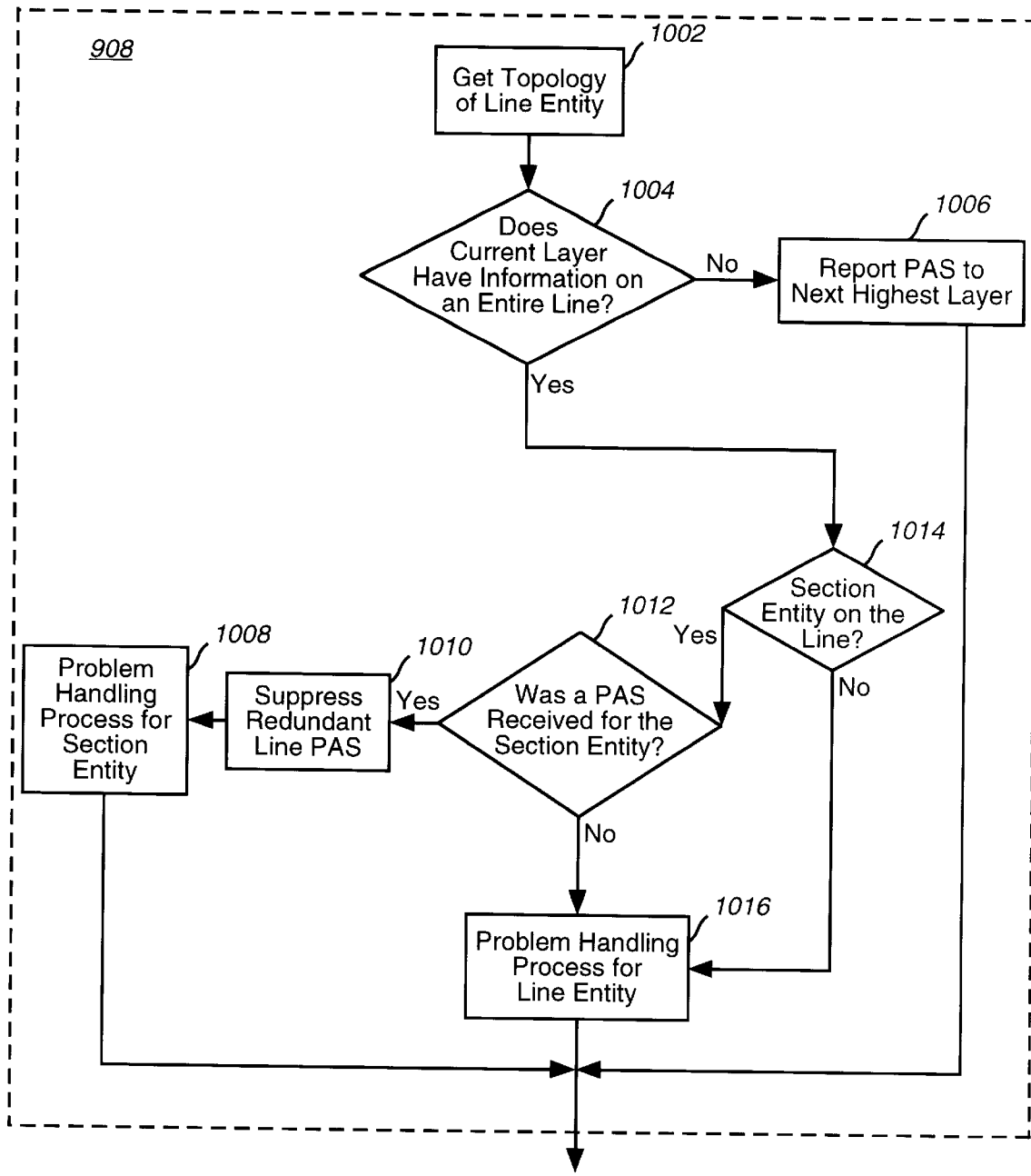

FIG. 10 is a detailed flowchart of the line-correlation analysis process performed in step 908. In step 1002, the element manager 141 retrieves the topology of the line entity. In one embodiment, the topology of the section, line and path entities are stored as a data file in a database accessible by the layers in network management system 100. The topology data describes the facilities, or network elements, traversed by the provisioned channel. The topology will include all of the distinct section entities on the line if any exist, and all of the network elements on the line.

In step 1004, the element manager 141 determines if a complete view of the entire line is available at the current network management layer based on the topology information retrieved in step 1002. If the element manager 141 does not have a complete view of the entire line, then the correlation analysis process cannot continue. More specifically, in order to determine if the line entity PAS is an artifact of a section entity PAS, the entire line must be visible to the element manager 141. For example, if the line entity is terminated by network elements 151 and 156, element manager 141 does not have a complete view of the line entity. Further sectionalization of the network problem is therefore precluded.

If the element manager 141 determines in step 1004 that it does not have a complete picture of the entire line, then the path PAS is reported to the nexthighest layers in network management system 100 (in this case NML 130) in step 1006, and control then flows to step 912 (FIG. 9).

If the element manager 141 determines in step 1004 that it has a complete view of the entire line, then step 1014 is performed. In step 1014, the element manager 141 determines if the line entity contains a section entity. As stated previously, a line entity may contain multiple section entities, depending on the particular line in the path.

If it is determined at step 1014 that the line does not contain distinct section entities, then it is known that the line entity PAS was caused by problems in the LTE. In this case, element manager 141 in step 1016 initiates a problem handling process for a line entity. Such a process is the same as a problem handling process, but is targeted to a problem on the specific line facility that generated the PAS.

If it is determined that the line contains distinct section entities, the element manager 141 continues at step 1012. In step 1012, the network manger 131 determines whether any of the section entities on the line have raised PASs. If no section entity on the line has not raised a PAS, then the element manager 141 knows that the line PAS is not a redundant artifact of a section entity PAS on the line. A problem handling process for a line entity, therefore, is initiated by the element manager 141 in step 1016.

If it is determined in step 1012 that a section entity on the line has raised a PAS, then the line entity PAS is a redundant artifact of the reported section entity PAS. Therefore, the process suppresses the redundant line PAS at step 1010, and initiates a problem handling process for a section entity in step 1008.

After performing step 1006, 1016 or 1008, control flows to step 912 (FIG. 9).

Returning to FIG. 9, if it is determined in step 904 that the PAS is being raised from a path terminating element on the path, then the element manager 141 begins the path correlation analysis process of step 910. The path correlation analysis process of step 910 is illustrated in more detail in FIG. 11.

Figure 11:
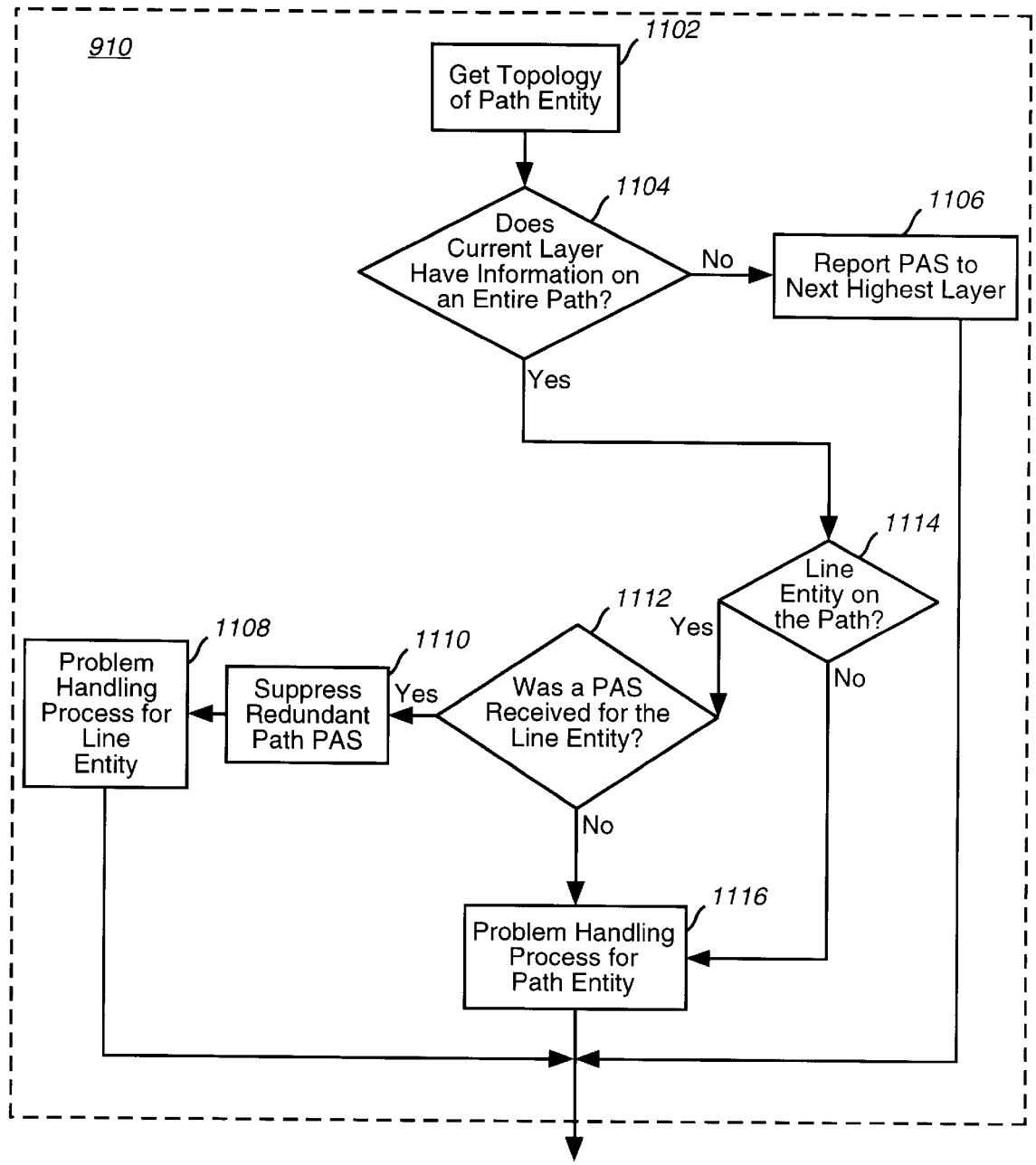

FIG. 11 is a detailed flowchart of the path-correlation analysis process performed in step 910. In step 1102, the element manager 141 retrieves the topology of the path entity. In step 1104, the element manager 141 determines if a complete view of the entire path is available at the current layer in network management system 100 based on the topology information retrieved in step 1102. If the element manager 141 does not have a complete view of the entire path, then the correlation analysis process cannot continue. More specifically, in order to determine if the path entity PAS is an artifact of a line entity PAS, the entire path must be visible to the element manager 141.

If the element manager 141 determines in step 1104 that it does not have a complete picture of the entire path, then the PAS is reported to the next-highest layer in network management system 100 (in this case NML 130) in step 1106, and control then flows to step 912 (FIG. 9).

If the element manager 141 determines in step 1104 that it has a complete view of the entire path, then step 1114 is performed. In step 1114, the element manager 141 determines if the path entity contains distinct line entities. As stated previously, a path entity may contain multiple line entities, depending on the particular path.

If it is determined that the path does not contain distinct line entities, then it is known that the path entity PAS was caused by the path terminating equipment. For a path without distinct line entities, therefore, element manager 141 in step 1116 initiates a problem handling process for a path entity. Such a process is the same as a problem handling process, but is targeted to a problem on the specific path facility that generated the PAS.

If it is determined that the path contains distinct line entities the element manager 141 continues at step 1112. In step 1112, the network manger 131 determines whether any of the line entities on the path have raised PASs. If a line entity on the path has not raised a PAS, then the element manager 141 knows that the path PAS is not a redundant artifact of a line PAS on the path. A problem handling process for a path entity, therefore, is initiated by the element manager 141 in step 1116.

If it is determined in step 1112 that a line entity on the path has raised a PAS, the path entity PAS is a redundant artifact of the reported line entity PAS. Therefore, the process suppresses the redundant path PAS at step 1110, and initiates a problem handling process for a line entity in step 1108.

After performing step 1106, 1116 or 1108, control flows to step 912 (FIG. 9).

Figure 12:
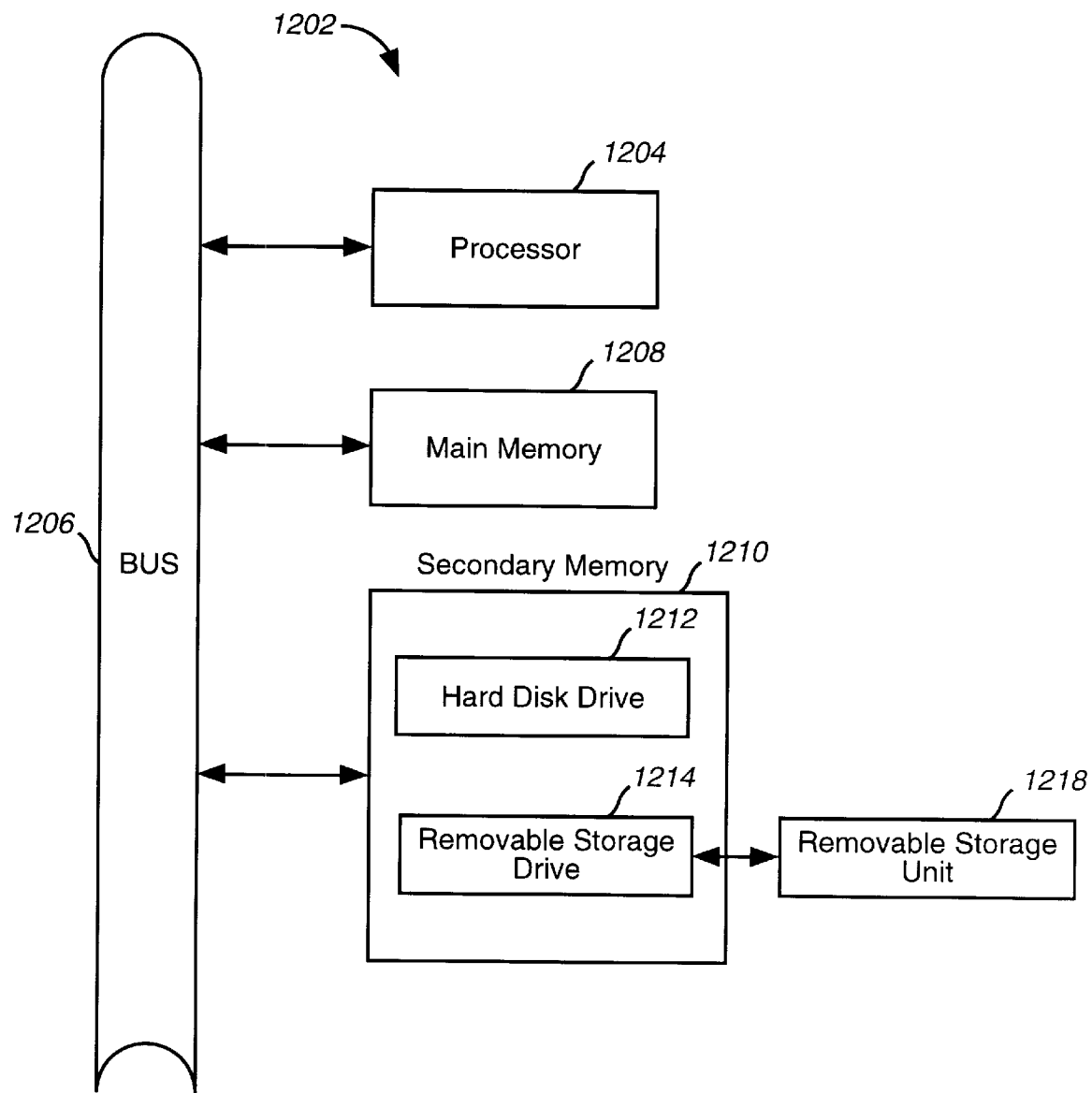
FIG. 12 illustrates a block diagram of a computer useful for implementing elements of the present invention.

In one embodiment, the invention is directed to a computer system operating as discussed herein. For example, functions in each of the network management layers 110, 120, 130, 140 and 150 are implemented using computer systems. An exemplary computer system 1202 is shown in FIG. 12. The computer system 1202 includes one or more processors, such as processor 1204. The processor 1204 is connected to a communication bus 1206.

The computer system 1202 also includes a main memory 1208, preferably random access memory (RAM), and a secondary memory 1210. The secondary memory 1210 includes, for example, a hard disk drive 1212 and/or a removable storage drive 1214, representing a floppy disk drive, a magnetic tape drive, a compact disk drive, etc. The removable storage drive 1214 reads from and/or writes to a removable storage unit 1218 in a well known manner.

Removable storage unit 1218, also called a program storage device or a computer program product, represents a floppy disk, magnetic tape, compact disk, etc. As will be appreciated, the removable storage unit 1218 includes a computer usable storage medium having stored therein computer software and/or data.

Computer programs (also called computer control logic) are stored in main memory and/or the secondary memory 1210. Such computer programs, when executed, enable the computer system 1202 to perform the features of the present invention as discussed herein. In particular, the computer programs, when executed, enable the processor 1204 to perform the features of the present invention. Accordingly, such computer programs represent controllers of the computer system 1202.

In another embodiment, the invention is directed to a computer program product comprising a computer readable medium having control logic (computer software) stored therein. The control logic, when executed by the processor 1204, causes the processor 1204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method in a network management system for detecting intermittent network performance problems, comprising the steps of:

receiving performance monitoring data from one monitoring point associated with a network facility, said performance monitoring data collected by said monitoring point during a first predefined time period;

determining whether said performance monitoring data indicates an existence of a potential network problem;

determining whether said monitoring point has reported nonzero, even though non-critical, error activity for previous monitoring periods within said first predefined time period;

initiating a problem handling process if nonzero, even though non-critical, error activity previously has been detected but not been reported during said previous monitoring periods within said first predefined time period; and maintaining said problem handling process if said monitoring point reports during a second predefined time period multiple non-zero, even though non-critical, error activities related to said nonzero, even though non-critical, error activity detected in said first predefined time period.

2. The method of claim 1, further comprising the step of clearing said problem handling process if no additional non-zero error activity is reported during said second predefined time period.

3. The method of claim 1, wherein said step (2) comprises the step of comparing reported error activity for a monitored parameter to a threshold.

4. The method of claim 1, wherein said step (2) comprises the step of analyzing said performance monitoring data in relation to performance monitoring data collected during pervious monitoring periods.

5. The method of claim 4, wherein said step (2) comprises the step of identifying whether a historical pattern of error activity matches a pattern of error activity that is known to lead to a network problem.

6. A system in a network management system for detecting intermittent network performance problems, comprising:
   a network element in said network management system that:
      receives performance monitoring data from one monitoring point associated with a network facility, said performance monitoring data collected by said monitoring point during a given at least one or more monitoring periods within a first predefined time period;
      determines whether said performance monitoring data collected during said given monitoring periods indicate an existence of a potential network problem;
      initiates a problem handling process upon determining whether said monitoring point has reported nonzero, even though non-critical, error activity different from previous said given monitoring periods within said first predefined time period; and
      maintains said problem handling process if said monitoring point reports multiple nonzero, even though non-critical, error activities related to previous error activity in said initiates step during subsequent monitoring periods in a second predefined time period following said first predefined time period.

7. The system of claim 6, further comprising means for clearing said problem handling process if no additional non-zero error activity is reported during said second predefined time period.

8. The system of claim 6, wherein said means for determining whether said performance monitoring data indicates an existence of a potential network problem further comprises means for comparing reported error activity for a monitored parameter to a threshold.

9. The system of claim 6, wherein said means for determining whether said performance monitoring data indicates an existence of a potential network problem further comprises means for analyzing said performance monitoring data in relation to performance monitoring data collected during pervious monitoring periods.

10. The system of claim 9, wherein said means for determining whether said performance monitoring data indicates an existence of a potential network problem further comprises means for identifying whether a historical pattern of error activity matches a pattern of error activity that is known to lead to a network problem.

11. The system in claim 6, wherein the network element is a network manager.

12. The system in claim 6, wherein the network element is an element manager.

13. The system in claim 6, wherein the network element is a services management element.

14. A method of detecting potential network problems in a network management system, comprising the steps of;
   receiving raw performance monitoring data collected during one of plurality of monitoring periods within a first predetermined monitoring time period at a monitoring point;
   determining said raw performance monitoring data includes non-critical error data, wherein said non-critical error data has non-zero, non-critical error values indicating potential performance degradation within system tolerance ranges but greater than a predetermined threshold;
   comparing said raw performance monitoring data collected during said one of a plurality of monitoring periods within said first predetermined monitoring time period at said monitoring point with raw performance monitoring data collected at said monitoring point during another of said plurality of monitoring periods within said first predetermined monitoring time periods;
   initiating a problem handling report upon determining that raw performance data that includes non-zero, non-critical error data was collected during multiple of said plurality of monitoring periods within said first predetermined monitoring time period and that no prior problem handling report was initiated; and
   maintaining said problem handling report if raw performance monitoring data collected during one of a plurality of monitoring periods within a second predetermined monitoring period of time subsequent to said first predetermined monitoring period of time includes repeated non-zero, though non-critical, error data.

* * * * *